Dec. 3, 1968    J. W. HUFFMAN ET AL    3,414,858
TILT RESPONSIVE SAFETY SWITCH

Filed Feb. 23, 1966    4 Sheets-Sheet 1

INVENTOR.
JOHN W. HUFFMAN
GERALD RONALD WHARTON
BY Harry O. Ernsberger
ATTORNEY

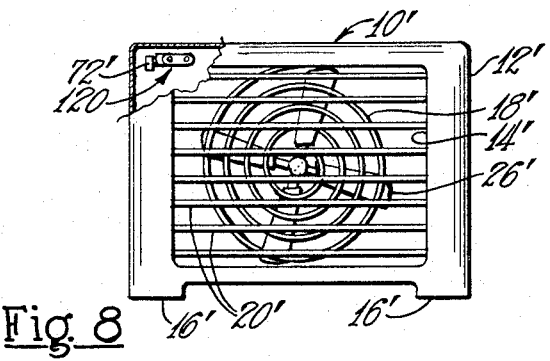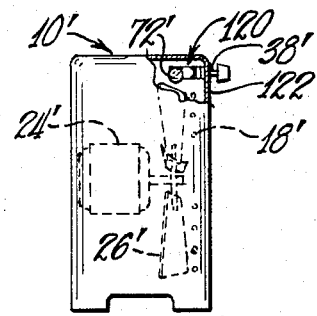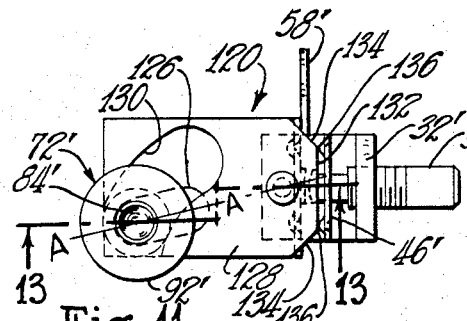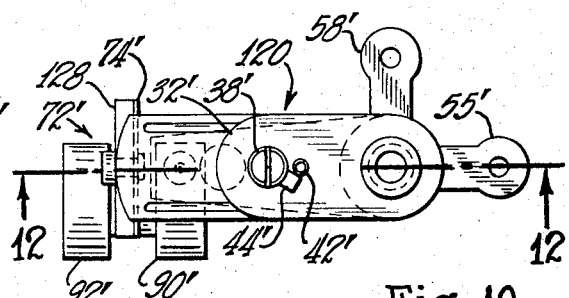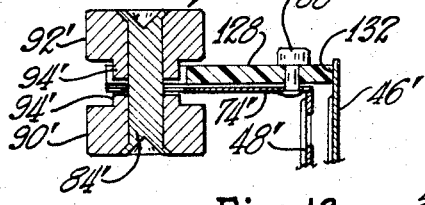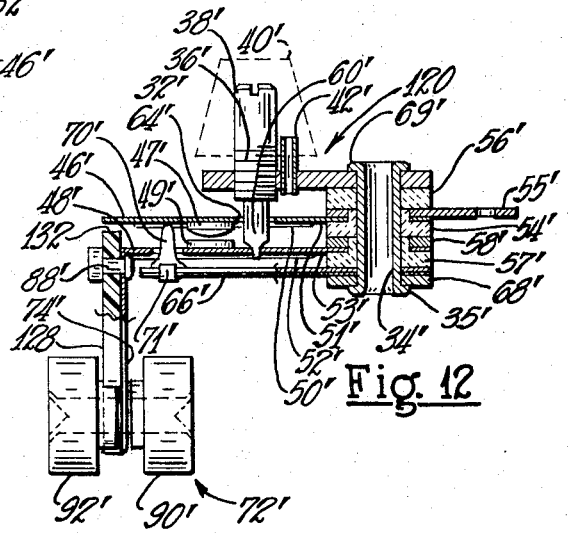

Dec. 3, 1968 J. W. HUFFMAN ET AL 3,414,858
TILT RESPONSIVE SAFETY SWITCH
Filed Feb. 23, 1966 4 Sheets-Sheet 3

INVENTOR.
JOHN W. HUFFMAN
GERALD RONALD WHARTON
BY Harry O. Ernsberger
ATTORNEY

United States Patent Office 3,414,858
Patented Dec. 3, 1968

3,414,858
TILT RESPONSIVE SAFETY SWITCH
John W. Huffman and Gerald Ronald Wharton, Mansfield, Ohio, assignors, by mesne assignments, to Emerson Electric Co., St. Louis, Mo., a corporation of Missouri
Filed Feb. 23, 1966, Ser. No. 529,588
12 Claims. (Cl. 337—13)

ABSTRACT OF THE DISCLOSURE

The invention embraces a tilt responsive safety switch or tip over switch particularly for mounting on an electrical appliance such as an electrically energizable space heater, the switch incorporating contacts which are automatically disengaged by relative slidable movement of a gravity-actuated slidable body whenever the appliance or space heater is tilted or is tipped over.

This invention relates to a tip over switch or safety switch for use with an electrical appliance such as an electrically heated appliance and more particularly to a tip over switch for use with electrically energized heating devices such as space or room heaters and the like where it is desirable to de-energize a heating unit of an appliance whenever the appliance is tipped over or displaced from an upright or normal position.

Tip over switches have been used to de-energize electrically heated appliances when they are inadvertently tipped over wherein a spring-biased actuating rod is released to actuate a switch. Pendulum actuated switches have also been used for the purpose. In pendulated switch devices, a pendulum is mounted to swing about a fixed center or axis with no control over the extent of swinging movement of the pendulum when the switch is displaced with the result that the pendulum may swing to such an extent as to damage the switch mechanism or render the control inoperative.

A safety switch for space heaters or room heaters of the electrically energized type is desirable in order that the heating element be de-energized when the heater or appliance is tipped over to prevent rugs or other inflammable material on the floor from being burned.

The present invention embraces a tip over or safety switch adapted to be supported by an electrical appliance or electrically energized heating unit and incorporating switch contacts intercalated in the energizing circuit of the heating unit wherein the contacts are automatically disengaged through the medium of a slidable mass, weight or body supported in a manner whereby gravity displaces the mass, weight or body to assure separation of the contacts in the event that the appliance or heating unit is tipped over.

Another object of the invention is the provision of a tip over or safety switch for electrically heated appliances such as space heaters incorporating a gravity-actuated slidable weight or body which, when displaced from a predetermined normal position, automatically interrupts the circuit of the appliance.

Another object of the invention is the provision of a tip over safety switch means embodying manual control of one switch member and thermostat or thermo-responsive control of another switch member whereby the temperature range for an electrically heated appliance such as a space heater may be adjusted manually and the temperature automatically maintained by the thermoresponsive or thermostat means, the switch arrangement embodying a gravity-actuated slidable body for automatically interrupting the circuit in the event the appliance is tipped over.

Another object of the invention resides in a safety switch embodying relatively movable contacts and incorporating a gravity-actuated slidable body automatically movable to a position separating the contacts when the appliance with which the switch is used is tipped over or moved from an upright position and wherein the slidable body moves in a controlled path and is effective to actuate an element for separating the contacts and wherein the body is automatically slidably moved under the influence of gravity to a normal position upon restoration of the appliance to its normal upright or operative position.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 8 is a front elevational view of an appliance embodying an electrically energizable heating unit illustrating another form of safety or tip over switch mounted in a horizontal normal position;

FIGURE 9 is a side elevational view of the appliance shown in FIGURE 8;

FIGURE 10 is a view of the tip over switch mechanism shown in FIGURE 8 mounted in a normal or horizontal position;

FIGURE 11 is an end view of the construction shown in FIGURE 10;

FIGURE 12 is a longitudinal sectional view taken substantially on the line 12—12 of FIGURE 10;

FIGURE 13 is a detail sectional view taken substantially on the line 13—13 of FIGURE 11;

FIGURE 14 is an end view illustrating the switch of FIGURE 11 in circuit interrupting condition when the appliance is in tipped-over position;

The tip over or safety switch of the invention is particularly adaptable for use with room heaters or space heaters of the electrically energizable type, the invention embracing gravity-actuated slidable means in combination with manually operable and thermoresponsive temperature control means for interrupting an energizing circuit of the appliance whenever the appliance is tipped over, the invention also embracing gravity actuated slidable circuit interrupting switch means without manual or thermoresponsive temperature control devices.

Figure 1:
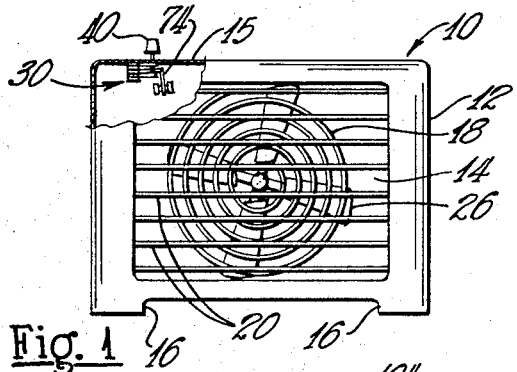
FIGURE 1 is a front elevational view of an appliance or space heater incorporating an electrically energizable heating unit, the space heater embodying a form of tip over or safety switch of the invention.
Figure 2:
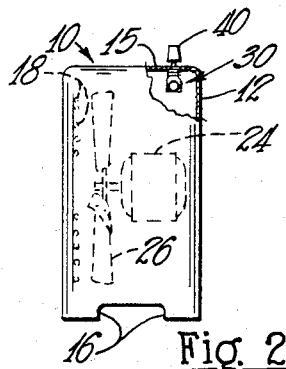
FIGURE 2 is a side elevational view of the appliance illustrated in FIGURE 1.
Figure 3:
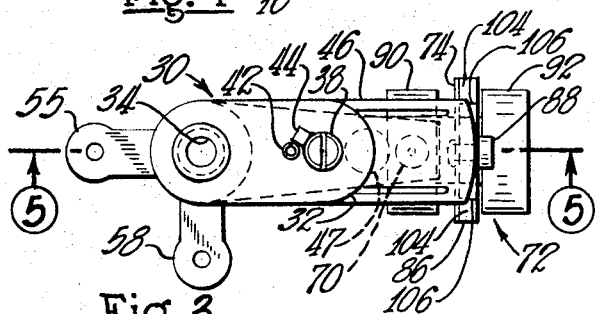
FIGURE 3 is a top plan view of the tip over switch of the invention shown in FIGURES 1 and 2.

Referring to the drawings in detail, one form of tip over switch or safety switch means provided with manual and thermoresponsive temperature controls is illustrated in FIGURES 1 and 2 mounted in an operative or normal position on an appliance, FIGURES 3 through 7 illustrating the structural arrangement of the tip over switch means mounted on the appliance shown in FIGURES 1 and 2.

An electrical appliance 10 is illustrated in FIGURES 1 and 2, the appliance being an electrically energizable room or space heater of conventional construction. The heater illustrated is inclusive of a sheet metal housing 12 having a front opening 14 preferably of rectangular shape and foot pad portions 16 whereby the space heater may be normally supported in an upright position by a floor or other surface.

Disposed adjacent the front opening 14 and within the housing 12 is an electrically energizable heating unit or element 18 of the conventional resistance type which, in the embodiment illustrated, is of spiral configuration and is adapted to be connected with a supply of electric current.

A plurality of bars or members 20 extend across the opening 14 and provide a grill-like protection for the heating element 18 without appreciably obstructing air flow. Mounted within the housing 12 is an electrically energizable motor 24 which drives a fan or air moving means 26 for circulating air adjacent the heating element 18. The rear panel of the housing 12 may have openings for admission of air to the housing or the lower portion of the housing may be open to admit air to the housing.

A form of tip over switch means 30 of the invention is mounted upon an upper horizontal panel 15 of the housing 12 and is connected in the circuit of the electric heating element 18 providing a circuit controlling means for the heating element. The structural arrangement of the tip over switch means or safety switch 30 is illustrated in FIGURES 3 through 7.

The switch construction 30 includes support means comprising a plate or member 32 to which is secured a metal sleeve or tubular member 34 forming a component of the support means, the sleeve 34 being secured in an opening in the plate 32.

The plate 32 is provided with a threaded opening receiving a threaded portion 36 of a shaft or member 38 which is adapted to be manually rotated for adjusting the relative position of a switch arm or member hereinafter described. The shaft 38 is equipped with a manipulating knob 40 which, as shown in FIGURES 1 and 2, extends upwardly above the horizontal panel 15 of the space heater 10.

A circular dial (not shown) may be disposed on the panel 15 of the heater unit for cooperation with the manipulating knob 40, the dial being calibrated for a temperature range within the scope of rotative movement of the knob 40 and shaft 38. The plate 32 is equipped with an abutment pin 42 and the shaft 38 equipped with an abutment or stop means 44, which is adapted for engagement with the pin 42 for limiting the rotation of the shaft 38.

The switch construction is of the type usually referred to as a "stacked" switch and is inclusive of a first switch member 46 equipped with a contact 47, the switch arm or member 46 being fashioned of flexible metal whereby it may be flexed or moved under the influence of a thermoresponsive means or thermostat. The switch means includes a second switch member 48 equipped with a contact 49 for cooperation with the contact 47 to make and break the circuit of the heating unit 18 of the space heater illustrated in FIGURES 1 and 2.

The switch member 46 is preferably fashioned with longitudinally extending raised portions or ribs 50 terminating near but spaced from the mounting to provide a flexure region 51. The second switch member 48 is preferably fashioned with longitudinally extending raised portions or ribs 52 also terminating near but spaced from the mounting means to provide a flexure region 53. The first switch member 46 is provided with an opening to accommodate a tenon portion of an annular disc 54 of insulating material such as molded lava, the disc being received on the sleeve or tubular member 34.

Figure 5:
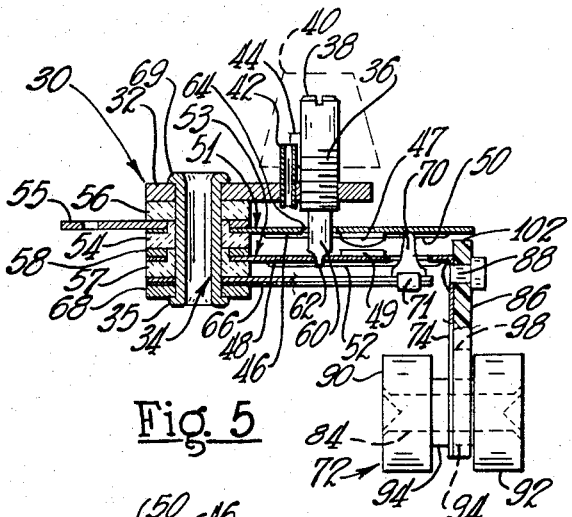
FIGURE 5 is a longitudinal sectional view taken substantially on the line 5—5 of FIGURE 3.

A terminal or connector 55 is also fashioned with an opening and is received on the tenon portion of the insulating disc 54, the terminal 55 being in direct metallic contact with the first switch arm 46. Disposed between the terminal 55 and the plate 32 is an annular insulating disc 56 of lava or other high temperature resistant rigid insulation. The second switch arm 48 is fashioned with an opening to accommodate a tenon portion on an annular insulating disc 57 mounted on the tube 34. A terminal or connector 58 has an opening receiving the tenon portion of the insulating member 56 as shown in FIGURE 5, the terminal member 58 being in direct metallic contact with the switch member 48.

The rotatable shaft 38 is provided at its lower region with a recess or bore accommodating a rigid member or strut 60 fashioned of lava or other rigid insulating material.

The lower end of the strut 60 is fashioned with a wedge shape configuration extending into a rectangularly-shaped opening in the switch member 48, the wedge shaped configuration 62 inhibiting relative rotation of the strut 60 and maintaining the strut against dislodgement with respect to the switch member 48. The strut 60 extends through a clearance opening 64 in the switch member 46, as shown in FIGURE 5.

Manual rotation of the shaft 38, through the medium of the strut 60, is effective to adjust the relative position of the switch arm or member 48 to the temperature desired to be maintained by the thermoresponsive means. The thermoresponsive means or thermostat comprises a bimetal element 66 having an opening at one end region whereby the bimetal element 66 is received on and mounted by the tube or sleeve 34 and is held in spaced relation with respect to the switch arm 48 by the insulating disc 57. Disposed between a flange 35 formed on the lower end of the tube 34 and the bimetal element 66 is a metal washer 68, as shown in FIGURE 5.

In assembly, the insulating discs 54, 56 and 57, the terminals 55, 58, switch arms 46 and 48 and the bimetal element 66 are mounted on the tube or sleeve 34 in stacked relation, after which the upper end of the sleeve 34 is swaged as at 69 to secure these components in assembled relation as illustrated in FIGURE 5. The distal end of the bimetal element 66 is provided with an insulating member or strut 70 of lava or other rigid insulating material secured by a metal clip 71.

When the heating element 18 of the space heater 10 is energized by a circuit completed through engagement of the contacts 47 and 49 and conductors (not shown) connected with the terminals heat is generated which influences the bimetal element 66.

When a predetermined temperature is attained in the space or room containing the heater 10, as determined by the manual adjustment of the shaft 38 controlling the position of the switch arm 48, the heat influences the bimetal element 66 to flex the distal end thereof upwardly causing separation of the contacts 47 and 49 and interrupting current flow to the heating element 18 and the fan motor 24. As the room or space containing the heater 10 becomes cool, the bimetal element 66 is flexed downwardly to engage contacts 47 and 49 and re-establish current flow through the heating element 18 of the appliance. This action continues whereby to automatically maintain the space or room at a desired predetermined temperature.

Figure 4:
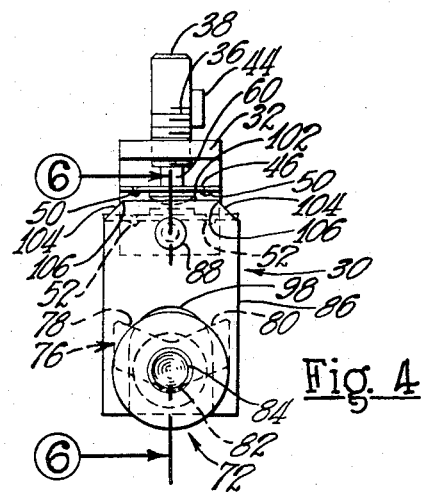
FIGURE 4 is an end view of the construction shown in FIGURE 3.

The tip over switch of the invention embodies a gravity-actuated mass, weight or body 72 arranged for relative sliding movement with respect to the switch arm 48 when the space heater or appliance 10 is tipped forwardly or backwardly, the sliding movement of the mass, weight or body 72 transmitted to the switch arm 46 for moving the same to effect disengagement of the contacts 47 and 49 irrespective of the relative positions of the switch arms 46 and 48. The switch arm 48 is of L-shaped configuration having a depending leg portion 74 normally disposed in a substantially vertical position, as shown in FIGURES 1, 4 and 5.

The depending leg portion 74 is fashioned with a shallow V-shaped opening or slot 76 comprising two generally converging open regions 78 and 80, the lower edge walls defining the convergent regions 78 and 80 being connected by a curved surface 82 providing a slight depression at the convergence of the open areas or slotted regions 78 and 80. The upper and lower edge walls defining the slot 76 are spaced to accommodate a pin or shaft 84 which is slidable in the slot 76.

Disposed contiguous and substantially parallel with the depending leg portion 74 of switch member 48 is a member or block 86 of rigid insulating material such as a phenol condensation product known commercially as Bakelite or Micarta. Formed in the upper region of the leg portion 74 is an opening aligned with an opening in the insulating block 86, the openings receiving a rivet or pivot pin 88, the pin being loosely received in the openings in the leg portion 74 and insulating member 86 to provide for pivotal movement of the insulating member or block 86 with respect to the leg portion 74.

Fixedly mounted upon the pin or shift 84 are cylindrically-shaped metal members or bodies 90 and 92, each being fashioned with a cylindrically shaped tenon portion 94, the pin 84 and cylindrical members 90 and 92 comprising the gravity controlled slidable mass, weight or body 72. The tenon portions 94 are spaced to loosely accommodate the leg portion 74 of switch arm 48.

The mass, weight or body 72 provided by members 90 and 92 and the pin 84 is arranged for slidable movement with respect to the leg portion 74 when the heater unit or appliance 10 is tipped over. The pin 84 and members 90 and 92 are preferably of ferrous metal such as steel or other metal of high density.

The relative position of the insulating block 86 with respect to the leg portion 74 is controlled by the position of the pin 84 and the cylindrical members 90 and 92 relative to the slot 76. The insulating block 86 is fashioned with a U-shaped recess 98 providing leg portions 100 which straddle the tenon 94 on the cylindrical member 92 in the manner shown in FIGURES 4 through 7. The insulating block 86 in conjunction with the weight or body 72 provide an actuating means for flexing the switch arm 46 away from the switch arm 48 to separate the contacts 47 and 49 when the space heater or appliance 10 is tipped over.

The upper edge surface 102 of the insulating block 86 is normally parallel with the switch arm 46 as shown in FIGURE 4 and is spaced from the switch arm sufficiently to facilitate normal flexure on the switch arm 46 to open and close the contacts 47 and 49 under the influence of the bimetal element 66. The upper corner regions of the insulating block 86 are formed with chamfers or angular surfaces 104 which, at their regions of juncture with the upper edge surface 102, form lands or lobes 106 for selective engagement with the switch arm 46 in the manner shown in FIGURE 7.

When the heating unit or appliance 10 is in its normal upright position illustrated in FIGURES 1 and 2, the shaft 38 is in a substantially vertical position, the leg portion 74 of switch arm 48 is in a depending vertical position and the pivotally supported insulating block 86 depends in a vertical position from the pivot pin 88. In this position of these components the pin or shaft 84 is engaged in the recess 82 at the region of convergence of the two angularly arranged open regions or slots 78 and 80, as shown in FIGURE 4, the upper edge surface 102 of the insulating block 86 being spaced from and parallel with the switch arm 46.

Under normal operation of the switch in controlling room temperature, the bimetal element, under the influence of temperature variations, flexes or controls the switch arm 46 to establish engagement or disengagement of the contacts 47 and 49 to complete or interrupt the circuit through the heating element 18 of the space heater or appliance 10. The manually rotatable shaft 38 is rotated to a position at which it is desired to maintain the temperature of the room or space containing the appliance 10, and the bimetal element or thermo-responsive means 66 thereafter automatically controls the ambient temperature.

Figure 7:
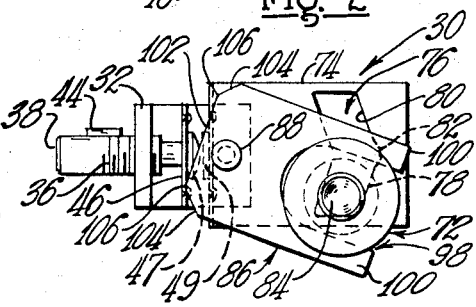
FIGURE 7 is an end view illustrating the switch in circuit interrupting condition when the appliance is in tipped over position.

When the appliance is inadvertently tipped forward, that is, with the frontal face of the appliance against a horizontal supporting surface such as a floor, the switch means 30 is moved to the position shown in FIGURE 7 with the axis of the shaft 38 substantially horizontal.

As the appliance is moving to "tipped over" position and the switch 30 is thereby moved toward the position shown in FIGURE 7, the force of gravity acts upon and causes the weight or mass 72 to slide generally downwardly relative to the depending leg 74, its path of sliding movement being controlled by the angularity of the slot region 78, the slot guiding the pin 84 to the position shown in FIGURE 7.

When the weight or body 72, provided by members 90 and 92 and pin 84, moves downwardly, one of the leg portions 100 of the U-shaped recess 98 in the insulating block 86 is engaged by the tenon portion 94 on the cylindrical member 92 and the insulating block 86 is pivotally moved about the axis of the pivot shaft or rivet 88 to the position shown in FIGURE 7. As the insulating block 86 moves about its pivot support 88, one of the lands or lobes 106 engages the switch arm 46 in the manner shown in FIGURE 7 forcing the switch arm upwardly or away from the switch arm 48 to positively separate the contacts 47 and 49 and thus automatically interrupt the energizing circuit through the heater or heating element 18 thereby eliminating a fire hazard.

When the appliance or space heater 10 is restored to its normal or upright position, the mass or weight 72 is slidably returned or moved by gravity to its normal position indicated in FIGURE 4.

During slidable movement of the mass or weight 72 along the slot 76 to its normal position depending on a vertical axis of the leg 74, one of the legs 100 of the insulating block 86 is engaged by the tenon portion 94 of the cylindrical member 92 and the block 86 pivotally moved about the rivet 88 to its normal position shown in FIGURE 4, in which position the upper edge surface 102 is moved away from the switch arm 46 to permit normal flexure of the switch arm 46 under the influence of the bimetal element 66 to normally control the temperature of the room containing the space heater or appliance 10.

While the insulating block 86 and the mass or weight 72 effect flexure of the switch arm 46 when the appliance or space heater is tipped over, the end walls of the slot area 76 limit the extent of sliding movement of the mass or weight 72 relative to the leg 74 and velocity imparted to the components by inadvertent tipping of the appliance 10 does not impair the operation of the block 86 because its extent of pivotal movement and the extent of relative slidable movement of the mass or weight 72 is limited by the end walls of the slot 76.

If the appliance 10 is tipped rearwardly, the position of the parts and components shown in FIGURE 7 is reversed, the block 86 swinging about the rivet 88 in the opposite direction from that shown in FIGURE 7 to cause the opposite land or lobe 106 to engage the switch arm 46 and move the switch arm 46 away from the switch arm 48 to effect a positive separation of the contacts 47 and 49.

Thus, in the arrangement shown in FIGURES 3 through 7, the circuit to the heating element 18 of the appliance is deenergized whether the appliance is tipped over forwardly or rearwardly. There is a minimum of friction between the insulating block 86 and the depending leg portion 74 of the switch arm 48 as there is substantial clearance between the block 86 and the leg portion 74, and the weight or mass 72 is amply sufficient to overcome the small amount of friction and provide a reliable operating mechanism.

The angularity of the converging slots 78 and 80 comprising the slot 76 in the embodiment illustrated in FIGURES 3 through 7, causes the mass 72 to be quickly slidably returned by gravity to a position on the central vertical axis of the leg portion 74 of the switch member 48, in which position the pin 84 engages in the shallow recess 82 to resist displacement of the mass 72 by vibration of the appliance 10.

The angularity of the slot areas 78 and 80 provide for a minimum lateral dimension of the depending leg 74 to render the slots 78 and 80 as short as practicable and obtain pivotal angular movement of the insulating block 86 sufficient to deflect the switch arm 46 to a position to disengage the contacts 47 and 49. It is to be understood that the metal of the switch arm 46 is quite thin and sufficiently flexible in order that the force provided by the mass or weight 72, slidably moving toward the position shown in FIGURE 7, is adequate to flex the arm 46 at the flexing region 51 to separate the contacts 47 and 49.

FIGURES 8 and 9 illustrate a space heater or appliance 10' embodying a modified form of tip over switch construction of the invention, the modified form of tip over switch being illustrated particularly in FIGURES 10 through 14. The space heater 10' is substantially the same as the space heater shown in FIGURES 1 and 2 and is inclusive of a housing 12' having an opening 14' in the front panel and supporting feet or pads 16', an electrically energizable resistance heating element 18' and a plurality of bars or grids 20' extending across the opening 14' to protect the heating element against injury.

An electrically energizable motor 24' within the housing 12' is adapted to rotate an air moving means or fan 26' for circulating air adjacent the heating element 18' to heat the air. The modified form of tip over switch designated 120 is mounted in a substantially horizontal position on the front panel 122 of the appliance 10'. The switch construction 120 is illustrated in detail in FIGURES 10 through 14. Several of the components of the switch construction shown in FIGURES 10 through 14 are the same as corresponding components shown in the form of construction in FIGURES 3 through 7.

The switch construction 120 includes a support means comprising a plate or planar member 32' and a sleeve or tubular member 34' extending into an opening in the plate 32'. The plate 32' is provided with a threaded opening receiving the threaded portion 36' of a shaft 38', the latter equipped with a manipulating knob 40' of conventional construction for rotating the shaft 38'.

The plate 32' is provided with a pin or abutment 42' which is engaged by a stop pin 44' carried by the shaft 38', the pin 42' determining the extent of rotation of the shaft 38'.

The switch includes a first flexible switch arm 46' and a second switch arm 48', the switch arms being equipped with cooperating contacts 47' and 49'. The switch arm 46' is mounted upon a tenon portion of a lava insulating disc 54' and a terminal member 55', supported upon the disc 54', is in metallic contact with the switch arm 46'. An insulating disc 56' on the sleeve 34' is disposed between the terminal 55' and the support plate 32'. The second switch arm 48' is mounted upon a tenon portion of an annular insulating disc 57' of lava and a second terminal 58' is mounted upon the tenon portion of the insulating disc 57', the switch arm 48' being in metallic contact with the terminal 58'.

The switch member 46' is fashioned with longitudinally extending parallel raised portions or ribs 50' terminating near but spaced from the mounting to provide a flexure region 51'. The switch member 48' is likewise fashioned with longitudinally extending raised portions 52' terminating near but spaced from the mounting means to provide a flexure region 53'.

A recess in the lower end of the shaft 38' accommodates a rigid strut 60' of lava or other insulating material, the lower end of the strut having a wedge-shaped configuration extending into a rectangularly-shaped opening in the switch member 48' to prevent relative rotation of the strut 60'.

The strut 60' extends through a clearance opening 64' in the switch member 46'. Manual rotation of the shaft 38' is effective to adjust the relative position of the switch arm 48' to the temperature desired for the room or space containing the space heater.

The thermoresponsive means for controlling the relative position of the switch arm 48' comprises a bimetal element 66' mounted upon the sleeve 34' and spaced from the switch arm 48' by the insulating disc 57'. A metal washer 68' surrounds the tube 34' and is disposed between the flange 35' on the sleeve 34' and the bimetal element 66'. After the components carried by the sleeve 34' are assembled thereon, the upper end of the sleeve 34' is swaged as at 69' to secure the components in fixed relation on the sleeve 34'.

The distal end of the bimetal element 66' is equipped with an insulating member or strut 70' of lava secured by a clip 71'. The bimetal element is influenced by the ambient temperature environment to effect flexure of the bimetal element and thereby control the relative position of the switch arm 46' to engage or disengage the contacts 47' and 49' and thereby to energize or de-energize the heating element 18' for automatically controlling the temperature of the space or room containing the heater 10' as determined by the manual adjustment of shaft 38' controlling the position of the switch arm 48'.

The tip over switch construction illustrated in FIGURES 8 through 13 embodies a gravity-actuated mass, weight or body arranged for relative sliding movement when the space heater 10' is tipped forwardly to automatically disengage contacts 47' and 49'. The switch arm 48' is of L-shaped configuration having a leg portion 74' which is normally disposed in a horizontal position as shown in FIGURES 8 through 11 when the space heater 10' is in upright position as shown in FIGURES 8 and 9.

In this form of the invention the leg portion 74' is fashioned with an elongated closed slot 126 having its lengthwise axis A—A generally lengthwise of the leg portion 74' and angularly arranged with respect to the central axis of the leg 74', as shown in FIGURES 11 and 14. The lengthwise edge walls defining the slot 126 are spaced apart to accommodate the pin or shaft 84' which is slidable in the slot 126. Disposed contiguous with the leg portion 74' of the switch member 48' is a member or block 128 of phenolic resin insulating material such as Bakelite or Micarta.

The leg portion 74' and the block 128 are provided with aligned openings receiving a rivet or pin 88', the pin being loosely received in the openings to provide for pivotal movement of the block 86' with respect to the leg portion 74' with a minimum of friction.

Figure 6:
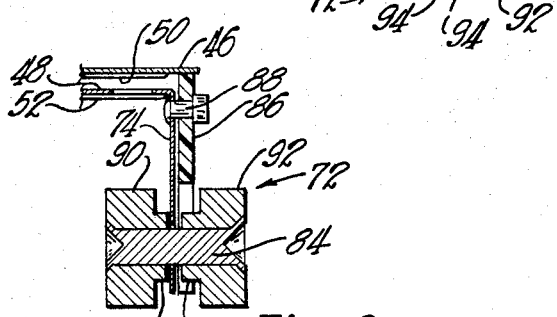
FIGURE 6 is a fragmentary sectional view taken substantially on the line 6—6 of FIGURE 4.

Fixed upon the pin 84' are cylindrical shaped metal members or bodies 90' and 92' of the same construction as shown in FIGURE 6, each member 90' and 92' being provided with tenon portions 94', the pin 84' and members 90' and 92' providing a mass, weight or body 72'. The tenons 94' are spaced to loosely accommodate the leg portion 74'. The unitary mass, weight or body 72' is arranged for slidable movement relative to the leg portion 74' under the influence of gravity when the space heater 10' is tipped over.

The position of the insulating block 128 with respect to the leg portion 74' is controlled by the position of the mass or weight 72' relative to the slot 126. The block 128 is fashioned with an open-ended curved slot 130, the curved edge walls of the slot being spaced to loosely embrace or straddle the tenon 94' on the cylindrical member 92', as shown in FIGURES 11, 13 and 14. The insulating block 128 and the mass or weight 72' provide an actuating means for flexing the switch arm 46' away from the switch arm 48' to separate the contacts 47' and 49' when the space heater 10' is tipped over.

The upper edge surface 132 of the insulating block 128 is normally parallel with the switch arm 46' as shown in FIGURES 11 through 13 and is normally spaced from the switch arm 46' sufficiently to permit flexure of the switch arm 46' to engage or disengage the contacts 47' and 49' under the influence or flexure of the bimetal element 66'.

The corner regions of the block 128 adjacent the switch arm 46' are formed with chamfers or angularly arranged surfaces 134 which, at their juncture with the upper edge surface 132 form lands or lobes 136, one of which is adapted for engagement with the switch arm 46', as shown in FIGURE 14, when the space heater 10' is tipped over.

When the heating unit or appliance 10' is in its normal or upright position as illustrated in FIGURES 8 and 9, the tip over switch means is in its normal position as illustrated in FIGURES 10 through 13. In this position the shaft 38' is substantially horizontal and the leg portion 74' is substantially horizontal, the leg portion 74' being maintained in such position by engagement of the tenon portion 94' of member 92' with the curved walls of the slot 130 and with the pin or shaft 84' at its extreme position of movement at the outermost end of the slot 126, as shown in FIGURE 11.

In this position, the upper edge surface 132 of the block 128 is spaced from the switch arm 46'. The bimetal element 66', under the influence of temperature variations, is flexed to actuate or control the relative position of the switch arm 46' through the insulating strut 70' to thereby effect engagement or disengagement of the contacts 47' and 49' to complete or interrupt the circuit through the heating element 18' of the space heater 10'. The shaft 38' is manually rotated to a temperature indication desired for the room or space containing the heater 10', and the bimetal element 66' automatically maintains such temperature by its influence on the position of the switch arm 46'.

When the appliance 10' is inadvertently tipped over in a forward direction, as viewed in FIGURE 9, with the frontal face 122 of the appliance facing downwardly, the switch means is moved to the position shown in FIGURE 14, with the shaft 38' and the leg portion 74' of the switch in a vertical position. During the tipping of the switch 120 to the ultimate position shown in FIGURE 14, gravity acts upon the weight, mass or body 72 to slide downwardly as permitted by the slot 126 until the pin is disposed in the end of the slot 126 nearest to the pivot pin 88'.

As the pin 84' moves downwardly in the angularly arranged slot 126, as viewed in FIGURE 14, the mass or weight 72' is moved closer to the vertical central axis of the leg 74'. As the tenon portion 94' on the member 92' affects the relative position of the block 128', the downward movement of the mass or weight 72', guided by the slot 126 and 130 causes a shifting or pivotal movement of the member 128 to the angular position, shown in FIGURE 14, thereby causing one of the lands or lobes 136 of the block 128 to engage the switch arm 46' forcing the switch arm 46' away from the arm 48' to positively separate the contacts 47' and 49' and interrupt the energizing circuit through the heating element 18' of the space heater 10'.

When the appliance is restored to its upright or normal position, the mass, weight or body 72 is slidably moved by gravity to the position shown in FIGURE 11, which movement causes the pin 84' to slide to its outermost left-hand position as viewed in FIGURE 11 and the tenon portion 94' on member 92', engaging the curved edge walls defining the slot 130', restores the member 128 to its normal horizontal position shown in FIGURE 11. In the horizontal position of the switch 120, the upper edge surface 132 of the insulating block 128 is spaced from the arm 46' to again permit normal flexure of the switch arm 46' under the influence of the bimetal element 66' for automatic temperature control.

The end walls of the slot 126 define the limits of relative slidable movement of the mass or weight 72' and the angular movement of the insulating block 128. The end walls of the slot 126 limits or restricts movement of the components and hence impact on these components by inadvertent tipping over of the appliance 10' does not impair the operation of the switch means to interrupt the circuit to the heaing element 18'. The pin 84' and the cylindrical components 90' and 92' are preferably fabricated of steel or other ferrous metals of high density to provide substantial mass slidably movable by gravity with sufficient force to flex the switch arm 46' and yet provide a construction which is compact and occupies a small space.

While the switch constructions hereinbefore described embody manually actuable means for adjusting the position of a switch arm for a particular temperature for a space or room and thermoresponsive means for automatically maintaining such temperature, the principles of the invention embrace a tip over switch or safety switch which is effective to de-energize a heating element of an appliance when the appliance is tipped over without manual or thermoresponsive temperature control means. One form of switch construction of this character is illustrated in FIGURES 15 through 17.

Figure 15:
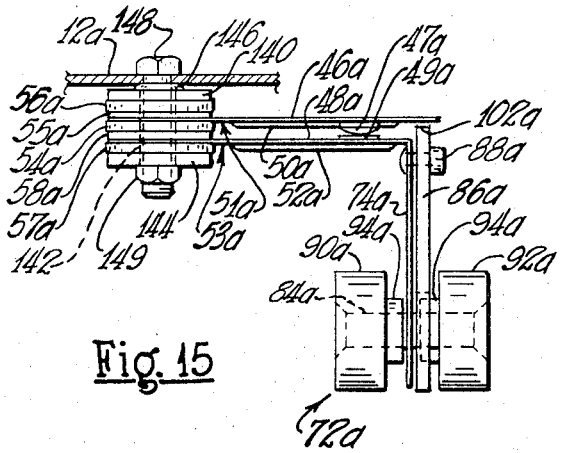
FIGURE 15 is an elevational view of a tip over or safety switch construction of the invention without temperature controlling means, the construction being shown in a vertically mounted normal position on an appliance.
Figure 16:
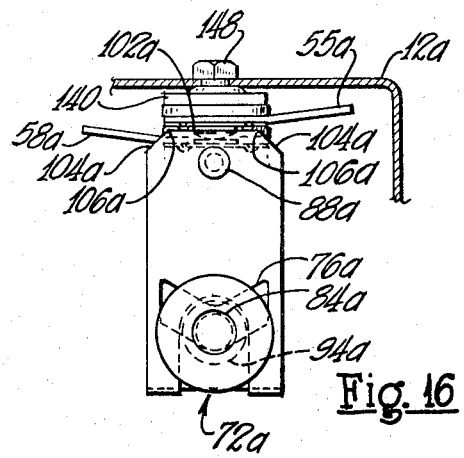
FIGURE 16 is an end view of the switch construction shown in FIGURE 15.
Figure 17:
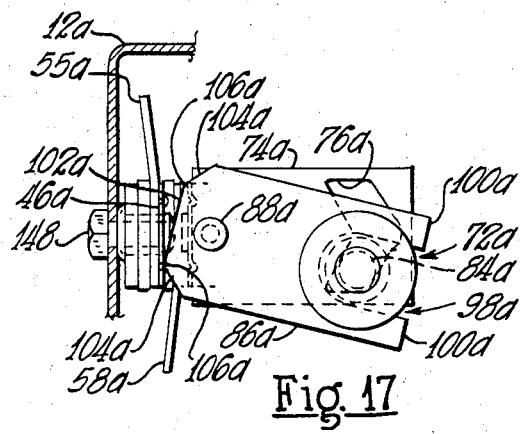
FIGURE 17 is an end view illustrating the switch of FIGURE 15 in circuit interrupting condition when the appliance is in tipped-over position.

The tip over switch construction of FIGURES 15 through 17 embodies several components which are identical with components of the construction shown in FIGURES 3 through 7. The appliance housing 12a is of the general character shown in FIGURES 1 and 2 and supports the tip over switch means. The tip over switch is inclusive of a support means which embraces a circular plate 140 and a sleeve 142 received in an opening in the plate, the sleeve 142 having a flange 144 at one end, the switch components being assembled on the sleeve 142.

The switch mechanism is inclusive of a first flexible switch arm 46a and a second switch arm 48a carrying cooperating contacts 47a and 49a which are intercalated in the energizing circuit of a heating element, such as the heating element 18 shown in FIGURES 1 and 2.

The switch member 46a is mounted on the tenon portion of an insulating disc 54a which also supports a terminal member 55a in metallic contact with the switch arm 46a. An insulating washer 56a of lava is disposed between the terminal member 55a and the support member 140.

The second switch member 48a is mounted upon a tenon portion of an annular insulating member 57a, the tenon portion supporting a second terminal member 58a in metallic contact with the switch arm 48a. After the components are assembled on the sleeve 142, the upper end thereof is swaged as at 146 in engagement with the member 140 to complete the assembly. The switch construction may be secured to the housing 12a by a bolt 148 extending through the sleeve 142 and receiving a securing nut 149.

The switch arms 46a and 48a are preferably fashioned respectively with parallel raised portions or ribs 50a and 52a of the character shown in the construction of FIGURE 5 to provide the flexure regions 51a and 53a for the switch arms. The switch arm 48a is fashioned with a depending leg portion 74a fashioned with a V-shaped opening or slot 76a of the same character as shown in FIGURE 4. The leg portion 74a supports a relatively slidable mass, weight or body 72a comprising a pin 84a and cylindrical members 90a and 92a, the pin 84a extending through the slot 76a.

A block 86a of rigid insulating material such as phenolic resin is disposed contiguous with the leg portion 74a and is pivotally connected with the upper region of the leg portion by a rivet 88a. The insulating block 86a is fashioned with a U-shaped recess 98a providing leg portions or furcations 100a which straddle a tenon portion 94a on the cylindrical member 92a. The upper edge surface 102a of the insulating block 86a is normally parallel with and spaced from the switch arm 46a. The upper corner regions of the insulating block 86a are chamfered as at 104a providing lands or lobes 106a, one of which engages and moves the switch arm 46a when the appliance is tipped over.

When a heater or appliance equipped with the construction shown in FIGURES 15 through 17 is in its normal upright position, the leg portion 74a of the switch arm 48a and the insulating block 86a are disposed in vertically depending positions, as shown in FIGURES 15 and 16, the upper edge surface 102 of the insulating block 86a being spaced from the switch arm 46a whereby the contacts 47a and 49a are engaged to complete a circuit through the heating element of the appliance or space heater.

When the appliance is tipped over, the switch means is moved to the position shown in FIGURE 17 and, during the tipping motion of the appliance, the force of gravity causes the mass, weight or body 72a comprising the pin 84a and the cylindrical members 90a and 92a to slide relative to the leg 74a to the position shown in FIGURE 17.

During this relative sliding movement of the mass or body 72a, the tenon portion 94a on the cylindrical member 92a moves the insulating block 86a to the angular position shown in FIGURE 17 by pivoting the block about the axis of the rivet 88a to engage one of the lands or lobes 106a with the switch arm 46a to flex the switch arm 46a away from the switch arm 48a and positively disengage the contacts 47a and 49a to interrupt the circuit to the heating element of the space heater.

When the space heater is restored to its normal or upright position, the components are returned to the position shown in FIGURES 15 and 16 with the upper edge surface 102a spaced from the switch arm 46a, permitting reengagement of the contacts 47a and 49a to reestablish a circuit to the heating element of the space heater. Thus, it will be seen that the construction shown in FIGURES 15 through 17 provides a simple, yet effective and reliable means for de-energizing the heating element of a space heater or appliance when the same is tipped over.

Figure 18:
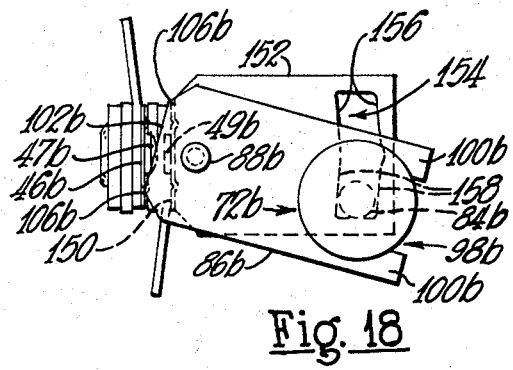
FIGURE 18 is a view similar to FIGURE 16 illustrating a modified form of guide slot for the relatively slidable control body of the switch construction.

FIGURE 18 illustrates a modification of the tip over switch shown in FIGURES 15 through 17. In the construction shown in FIGURE 18, the components are assembled and mounted in the same manner as shown in FIGURES 15 through 17. The switch arm 46b is of the same construction shown in FIGURE 15.

The second switch arm 150 is similar to switch arm 48a, being fashioned with a depending leg portion 152 of increased width as compared with the width of the leg portion 74a, shown in FIGURES 16 and 17, the switch arm or member 150 carrying a contact 49b for cooperation with the contact 47b on the first switch member 46b.

In this form of construction the depending leg portion 152 is fashioned with a transversely disposed slot 154 fashioned with very slightly convergent pairs of edge walls 156 and 158 whereby the slot 154 is of increased length as compared with the length of the slot 76a shown in FIGURES 16 and 17. The insulating block 86b is of the same construction as shown in FIGURE 17, being pivotally supported by a rivet 88b extending through openings in the insulating block and the leg portion 152 near the junction of the latter with the switch arm portion 150.

A mass, weight or body 72b, of the same character herein before described, includes a pin or shaft 84b extending through the slot 154, the mass 72b being slidable relative to the leg portion 152. The insulating block 86b is fashioned with a U-shaped recess 98b providing leg portions 100b straddling a tenon portion on one of the cylindrical members of the mass or body 72b.

The construction shown in FIGURE 18 functions in the same manner as that shown in FIGURES 15 through 17, FIGURE 18 illustrating the components when the appliance is in a tipped over position.

In this position one of the lands 106b, on the insulating block 86b, engages the switch arm 46b and flexes the same away from the switch arm 150 to disengage the contacts 47b and 49b. When the switch construction is restored to an upright position, the mass 72b slides to its central position in the slot 154, pivoting the block 86b to a vertical position with the upper edge surface 102b of the block spaced from the switch arm 46b to effect reengagement of contacts 47b and 49b and reestablish the circuit to the heating element of the appliance or space heater.

Through the use of a slot 154 of very shallow configuration shown in FIGURE 18, a proportionate increase in force provided by the mass 72b for flexing the switch arm 46b is provided as the distance between the axis of the rivet 88b and the axis of the pin or shaft 84b is increased as compared with the distance between the axis of the rivet 88a and the shaft 84a in the construction shown in FIGURE 17. In this arrangement the leg portion 152 is of increased width to accommodate the slot 154 of increased length.

Figure 19:
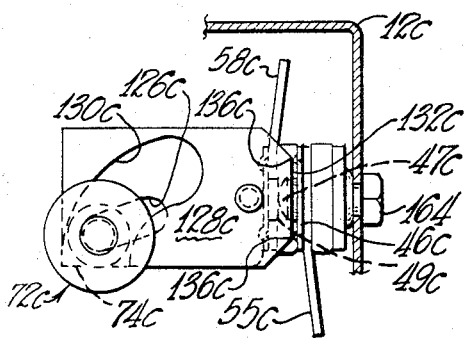
FIGURE 19 is an end elevational view of a tip over switch similar to that shown in FIGURE 11 without thermo-responsive means and manual control.
Figure 21:
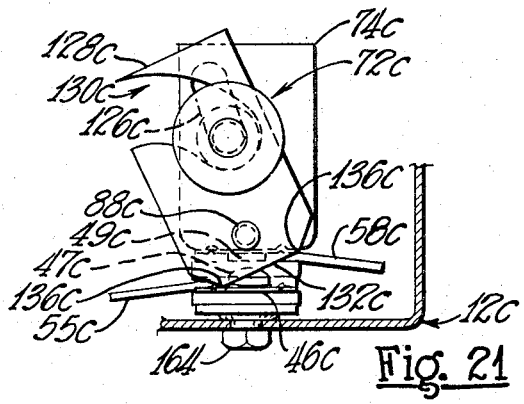
FIGURE 21 illustrates the position of the components of the switch mechanism of FIGURE 19 in circuit interrupting position when the appliance is in tipped-over position.
Figure 20:
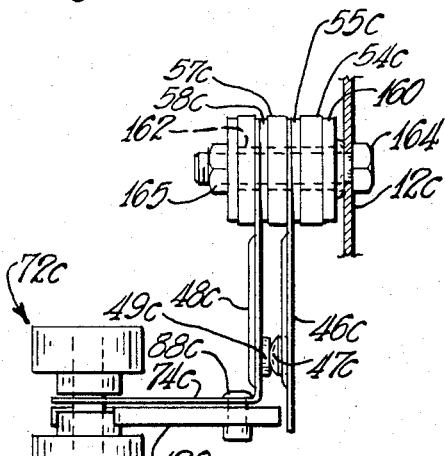
FIGURE 20 is a plan view of the arrangement shown in FIGURE 19 with the switch mounted in a horizontal position.

FIGURES 19 through 21 illustrate a tip over switch construction similar to that shown in FIGURES 10 through 14 but without a manual adjustment for a switch arm or a thermo-responsive means for a second switch arm. Several components of the construction shown in FIGURES 19 through 21 are similar to those of the construction shown in FIGURES 10 through 14.

The construction of FIGURES 19 through 21 is inclusive of a first switch arm 46c carrying a contact 47c, and a second switch arm 48c carrying a contact 49c which normally engages contact 47c to establish a circuit to an electrically heated appliance or space heater, a portion of the housing 12c of the space heater being shown.

The support means for the switch components includes a metal member or disc 160 and a tube or sleeve 162 extending through an opening in the disc 160. A terminal 55c is in metallic contact with the switch arm 46c and a second terminal 58c is in metallic contact with the second switch arm 48c. The switch arms and the terminals are insulatingly supported upon the tube 162 by annular insulating members 54c and 57c in the same manner as hereinbefore described in reference to the construction shown in FIGURE 12. The switch assembly may be secured to the housing 12c of the appliance by means of a bolt 164 receiving a securing nut 165.

The switch member 48c is provided with a projecting leg 74c fashioned with a slot 126c for guiding a slidable weight, mass or body 72c of the character shown in FIGURES 11 and 13. An insulating block 128c is pivotally supported on the leg 74c by a rivet 88c, the block 128c having an open-ended curved slot 130c which is of the same contour as the slot 130, shown in FIGURE 11. The upper edge surface 132c of the insulating block 128c is normally spaced from the switch arm 46c, the contacts 47c and 49c being in engagement.

The corners of the block 128c are chamfered to provide lands or lobes 136c, one of which is engageable with the switch arm 46c, in the manner shown in FIGURE 21, to disengage the contacts 47c and 49c.

The arrangement shown in FIGURES 19 through 21 is normally positioned with the leg portion 74c in a horizontal position, as shown in FIGURE 19, when the appliance is in an upright position. When the appliance is tipped over, the switch construction is rotated through about ninety degrees to the position shown in FIGURE 21. In this position, the leg 74c of the switch arm 48c is in a substantially vertical position and the insulating block 128c is pivotally moved by relative downward sliding movement of the mass 72c under the influence of gravity to the position shown in FIGURE 21.

Due to the angularity of the slot 126c in the leg 74c and the curvature of the slot 130c in the insulating block, 128c, the block is pivoted about the rivet 88c to the position shown in FIGURE 21 with one of the lands 136c engaging the switch arm 46c deflecting it downwardly, as viewed in FIGURE 21, to disengage the contacts 47c and 49c and thereby deenergize the heating element of the space heater.

When the space heater is restored to its upright or normal position, the switch mechanism or assembly is returned to its horizontal position, as shown in FIGURE 19.

During movement of the appliance to its upright position, the mass 72c slides toward the outermost limit of the slot 126c and, by reason of the curvature of the slot 130c in the insulating block 128c, the block is returned to its normal horizontal position with the surface 132c out of engagement with the switch arm 46c whereby the contacts 47c and 49c are engaged to reestablish a circuit to the heating element of the space heater.

Figure 22:
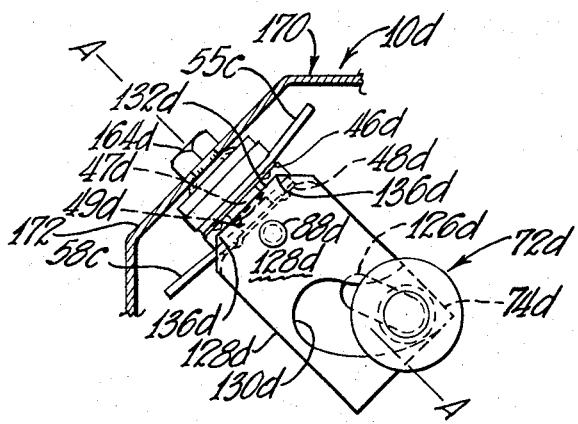
FIGURE 22 is a view similar to FIGURE 19 illustrating the switch construction of FIGURE 19 mounted on an appliance housing in an angular normal position with the appliance housing in an upright position.
Figure 23:
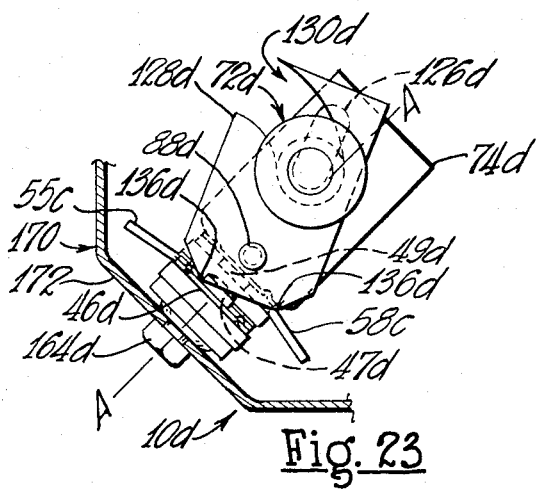
FIGURE 23 illustrates the switch mechanism of FIGURE 22 in circuit interrupting condition when the appliance is in tipped-over position.

FIGURES 22 and 23 illustrate the construction shown in FIGURES 19 through 21 mounted in a different position on an appliance or space heater 10b. The housing 170 of the appliance 10d may be fashioned with an angular panel portion 172 which provides a normal angular mounting position for the switch. It is preferable that the panel portion 172 of the appliance housing be disposed at about a forty-five degree angle with respect to the horizontal and vertical portions of the housing.

The switch mechanism is mounted on the panel portion 172 as by a bolt 164d which extends through a tubular sleeve upon which the switch arms 46d, 48d and the terminal connectors 55c and 58c are mounted, the normal position of the switch mechanism, with the appliance in upright position, being illustrated in FIGURE 22.

In this position, the mass 72d is at the extreme outermost end of the control slot 126d which, through the medium of curved slot 130d in the block 128d, maintains the block 128d with the upper edge surface 132d spaced from the switch arm 46d whereby the contacts 47d and 49d are in engaged relation establishing a circuit to the heating element of the appliance or space heater.

FIGURE 23 shows the position of the tip over switch when the appliance 10d is in a tipped over position. During the tipping movement of the appliance, the axis A—A of the switch means is shifted or turned through about a ninety degree angle to the angular position shown in FIGURE 23. During the tipping action of the appliance, the mass 72d moves downwardly to the lower end of the control slot 126d and, through the medium of the curved slot 130d, the insulating block 128d is pivotally moved about the axis of the rivet 88d to the relative angular position shown in FIGURE 23.

In this position, one of the lands or lobes 136d engages the switch arm 46d and deflects the switch arm generally downwardly, as viewed in FIGURE 23, to effect disengagement of the contacts 47d and 49d and thereby interrupt the energizing circuit through the heating element of the space heater.

It will therefore be seen that the tip over switch shown in FIGURES 19 through 21 may be mounted in the manner illustrated in FIGURES 22 and 23 and function in the same manner.

It is to be understood that the switch construction shown in FIGURES 10 through 14, which is similar to that shown in FIGURES 19 through 21 but with the addition of the manual control means for one switch arm and the thermoresponsive control means for the other switch arm, may be mounted in the position illustrated in FIGURE 22 and function in the same manner as hereinbefore described.

From the foregoing, it will be seen that the invention provides tip over switch means embodying a gravity-actuated slidable mass, weight or body, the relative sliding movement of which is transmitted through an insulating block to actuate a switch arm and effect a positive disengagement of contacts to de-energize a circuit of a heating element of an appliance or space heater equipped with the switch means whenever the appliance or space heater is tipped over.

It should be noted that in all forms of the construction of tip over switch disclosed herein, the pivotal axis of the relatively movable insulating block for actuating one of the switch arms is maintained as close as practicable to the end region of the block adjacent the switch arm actuated thereby so as to obtain the maximum force advantage of the sliding movement of the weight or mass actuated by gravity to thereby supply ample force for flexing the switch arm by the insulating block actuator.

It is apparent that, within the scope of the invention, modifications and different arrangements may be made other than as herein disclosed, and the present disclosure is illustrative merely, the invention comprehending all variations thereof.

We claim:

1. A tip over switch for use with an electrical appliance comprising in combination, support means, first and second switch arms mounted by the support means and having cooperating contacts, adjustable means mounted by the support means engaging the second switch arm for adjusting the relative position of the second switch arm, said second switch arm having a body guiding slot, an insulating member pivotally mounted on the second switch arm for movement relative thereto, said insulating member having a slot therein and a lobe, and a gravity controlled body having portions disposed in the slots in said second switch arm and said insulating member, said body being slidable in said slots under the influence of gravity when the switch is tipped over whereby the lobe of said insulating member engages the first switch arm and moves the first switch arm to separate the contacts.

2. The combination according to claim 1 including thermoresponsive means mounted by the support means, and insulating means disposed between the thermoresponsive means and the first switch arm whereby movements of the thermoresponsive means caused by temperature variations are transmitted to said first switch arm.

3. A tip over switch for use with an electrical appliance comprising in combination, support means, first and second switch arms mounted by the support means and having cooperating contacts, said second switch member having a laterally extending portion, an insulating member pivotally mounted on the laterally extending portion of the second switch member and having a lobe, a thermoresponsive member mounted by the support means, insulating strut means disposed between the thermoresponsive member and the first switch arm for transferring movement of the thermoresponsive member resulting from ambient temperature variations to said first switch arm, said insulating member being normally out of engagement with the first switch arm when said switch arms are in effective circuit controlling position, said insulating member and said laterally extending portion of the second switch member having body guiding slots therein, a body having portions disposed in said slots, said body being slidable in said slots relative to the second switch arm of said insulating member under the influence of gravity when the switch is tipped over to effect pivotal movement of the insulating member relative to the second switch arm to engage the lobe of the insulating member with the first switch arm and thereby move said first switch arm to a position disengaging said contacts.

4. The combination according to claim 3 including a manually adjustable element carried by the support means, and a pin of rigid insulating material in engagement with the element and the second switch arm whereby the position of said second switch arm relative to the first switch arm is controlled by the manually adjustable element.

5. A tip over switch for use with an electrical appliance comprising, in combination, support means, first and second switch arms mounted by the support means, cooperating contacts carried by said arms, said second switch arm having a slot therein, a gravity-controlled body having a portion disposed in said slot for slidable movement relative to the second switch arm, an insulating member pivotally mounted by the second switch arm for pivotal movement relative thereto, said member having a lobe normally out of engagement with the first switch arm, said insulating member having a slot, said body having a portion in the slot in the insulating member and adapted to move the insulating member upon sliding movement of the body relative to the second switch arm and the insulating member when the switch is tipped over to effect engagement of the lobe of the insulating member with the first switch arm and thereby move the first switch arm to separate the contacts.

6. The combination according to claim 5 wherein the gravity-controlled body is of metal.

7. The combination according to claim 5 wherein the gravity-controlled body has spaced cylindrical portions joined by a portion of reduced diameter, the portion of reduced diameter extending through the slot in the second switch member, at least one of said cylindrical portions having a tenon disposed in the slot in the insulating member adapted to actuate the insulating member upon sliding movement of the body in the slots.

8. The combination according to claim 5 wherein the slot in the second switch arm is a closed slot for limiting the relative sliding movement of the gravity-controlled body.

9. A tip over switch for use with an electrical appliance comprising, in combination, support means, first and second switch arms mounted by the support means and having cooperating contacts, said second switch arm having a laterally extending portion, an insulating member pivotally mounted on the laterally extending portion, said insulating member and the laterally extending portion having slots therein, a gravity-controlled body having portions disposed in said slots and being slidable relative to said insulating member and said second switch arm, said insulating member having a lobe normally out of engagement with the first switch arm when the switch arms are in effective circuit controlling position, said body being slidable in said slots under the influence of gravity when the switch is tipped to effect pivotal movement of the insulating member relative to the second switch arm to engage the lobe of the insulating member with the first switch arm and thereby move said first switch arm to a position disengaging said contacts.

10. The combination according to claim 9 including a bimetal element mounted by the support means, and a strut mounted on the bimetal element adapted to engage the first switch arm for controlling the position of the first switch arm upon relative movement of the bimetal element under the influence of ambient temperature variations.

11. A tip over switch for use with an electrical appliance comprising, in combination, support means, a pair of switch arms mounted by the support means, said switch arms having portions in substantial parallelism, cooperating contacts respectively carried by the portions of the switch arms in substantial parallelism, one of said switch arms having a laterally extending portion, said laterally extending portion having a body-guiding slot therein, a body having a portion disposed in said slot and mounted for slidable movement in said slot relative to the laterally extending portion of the said one switch arm, an insulating member pivotally mounted on the laterally extending portion of the said one switch arm and having a slot therein accommodating a portion of said body, said insulating member having a lobe normally out of engagement with the other of the switch arms whereby the contacts are normally engaged in circuit completing position when the switch is disposed in circuit completing position, said slots being shaped whereby tipping the switch through substantially ninety degrees effects slidable movement of said body in said slots under the influence of gravity and thereby effect pivotal movement of the insulating member to engage the lobe thereof with the other of said switch arms to disengage the contacts.

12. The combination according to claim 11 including a bimetal element mounted by the support means, means for transmitting movement of the bimetal element to the first switch arm, and manually adjustable means mounted on the support means and engaging the second switch arm to adjust the position thereof relative to the first switch arm.

References Cited
UNITED STATES PATENTS

| | | | |
|---|---|---|---|
| 3,175,059 | 3/1965 | Chestnut | 200—61.52 |
| 3,201,548 | 8/1965 | Mertler | 200—138 |
| 3,271,546 | 9/1966 | Chestnut | 200—138 |

BERNARD A. GILHEANY, *Primary Examiner.*

R. COHRS, *Assistant Examiner.*